US011736530B2

(12) United States Patent
Vaidya et al.

(10) Patent No.: US 11,736,530 B2
(45) Date of Patent: *Aug. 22, 2023

(54) FRAMEWORK FOR COORDINATION BETWEEN ENDPOINT SECURITY AND NETWORK SECURITY SERVICES

(71) Applicant: Nicira, Inc., Palo Alto, CA (US)

(72) Inventors: Sachin Mohan Vaidya, Pune (IN); Azeem Feroz, San Jose, CA (US); Anirban Sengupta, Saratoga, CA (US); James Christopher Wiese, San Ramon, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,411

(22) Filed: Dec. 4, 2021

(65) Prior Publication Data

US 2022/0094717 A1 Mar. 24, 2022

Related U.S. Application Data

(63) Continuation of application No. 16/684,400, filed on Nov. 14, 2019, now Pat. No. 11,196,773, which is a
(Continued)

(51) Int. Cl.
*H04L 29/06* (2006.01)
*G06F 21/55* (2013.01)
(Continued)

(52) U.S. Cl.
CPC .............. *H04L 63/20* (2013.01); *G06F 21/53* (2013.01); *G06F 21/554* (2013.01); *G06F 21/56* (2013.01); *G06F 21/568* (2013.01)

(58) Field of Classification Search
CPC ........ G06F 21/53; G06F 21/554; G06F 21/56; G06F 21/568
See application file for complete search history.

(56) References Cited

U.S. PATENT DOCUMENTS

| 7,797,748 B2 | 9/2010 | Zheng et al. |
| 7,801,128 B2 | 9/2010 | Hoole et al. |

(Continued)

FOREIGN PATENT DOCUMENTS

| AU | 2014254277 B2 | 9/2017 |
| CN | 101681404 A | 3/2010 |

(Continued)

OTHER PUBLICATIONS

Author Unknown, "NVD Common Vulnerability Scoring System Support v2," National Vulnerability Database, Jun. 20, 2007, 2 pages, National Institute of Standards and Technology.
(Continued)

*Primary Examiner* — Yonas A Bayou
(74) *Attorney, Agent, or Firm* — Adeli LLP (57) ABSTRACT

Systems and techniques are described for virtual machine security. A described technique includes operating one or more virtual machines each in accordance with a respective security container, wherein the respective security container is associated with a respective rule that specifies transfer of the virtual machine from the respective security container to a quarantine container based on one or more criteria. One or more security services are operated on the one or more virtual machines to identify one or more security threats associated with one or more of the virtual machines. One or more tags generated by the endpoint security services are obtained, where each tag is for a virtual machine that is associated with one of the identified security threats. And one of the virtual machines is identified as requiring transfer to the quarantine container based on, at least, one or more of the obtained tags and the one or more criteria.

20 Claims, 6 Drawing Sheets

Related U.S. Application Data continuation of application No. 16/112,732, filed on Aug. 26, 2018, now Pat. No. 10,511,636, which is a continuation of application No. 13/866,869, filed on Apr. 19, 2013, now Pat. No. 10,075,470.

(51) Int. Cl.
  *G06F 21/56* (2013.01)
  *G06F 21/53* (2013.01)
  *H04L 9/40* (2022.01)

(56) References Cited

U.S. PATENT DOCUMENTS

| | | | |
|---|---|---|---|
| 8,010,667 B2 | 8/2011 | Zhang et al. | |
| 8,127,291 B2 | 2/2012 | Pike et al. | |
| 8,255,806 B2 | 8/2012 | Halperin et al. | |
| 8,352,941 B1 | 1/2013 | Protopopov et al. | |
| 8,365,294 B2 | 1/2013 | Ross | |
| 10,075,470 B2 | 9/2018 | Vaidya et al. | |
| 10,511,636 B2 | 12/2019 | Vaidya et al. | |
| 11,196,773 B2 | 12/2021 | Vaidya et al. | |
| 2002/0194495 A1* | 12/2002 | Gladstone | H04L 63/0254 726/22 |
| 2003/0229794 A1 | 12/2003 | Sutton et al. | |
| 2005/0050377 A1 | 3/2005 | Chan et al. | |
| 2005/0071840 A1 | 3/2005 | Neiger et al. | |
| 2007/0107059 A1* | 5/2007 | Chasin | H04L 63/1416 726/23 |
| 2007/0143851 A1* | 6/2007 | Nicodemus | H04L 63/1433 726/4 |
| 2007/0192862 A1* | 8/2007 | Vermeulen | H04L 63/1441 726/23 |
| 2007/0250929 A1* | 10/2007 | Herington | G06F 21/566 726/24 |
| 2007/0266433 A1 | 11/2007 | Moore | |
| 2008/0189769 A1 | 8/2008 | Casado et al. | |
| 2008/0196100 A1 | 8/2008 | Madhavan et al. | |
| 2008/0222717 A1 | 9/2008 | Rothstein et al. | |
| 2008/0244569 A1 | 10/2008 | Challener et al. | |
| 2008/0289028 A1 | 11/2008 | Jansen et al. | |
| 2009/0006603 A1 | 1/2009 | Duponchel et al. | |
| 2009/0113031 A1 | 4/2009 | Ruan et al. | |
| 2009/0122710 A1 | 5/2009 | Bar-Tor et al. | |
| 2009/0158432 A1* | 6/2009 | Zheng | G06F 21/53 726/24 |
| 2009/0249473 A1 | 10/2009 | Cohn | |
| 2009/0282485 A1* | 11/2009 | Bennett | G06F 21/51 707/999.003 |
| 2010/0070870 A1* | 3/2010 | Halperin | G06F 21/53 726/19 |
| 2010/0138830 A1 | 6/2010 | Astete et al. | |
| 2010/0162397 A1* | 6/2010 | Lee | G06F 21/568 726/23 |
| 2010/0175063 A1 | 7/2010 | Ciano et al. | |
| 2010/0235831 A1 | 9/2010 | Dittmer et al. | |
| 2010/0306849 A1* | 12/2010 | Zheng | G06F 21/562 726/24 |
| 2010/0332889 A1 | 12/2010 | Shneorson et al. | |
| 2011/0072486 A1 | 3/2011 | Hadar et al. | |
| 2011/0078497 A1* | 3/2011 | Lyne | G06F 21/568 714/15 |
| 2011/0107331 A1 | 5/2011 | Evans et al. | |
| 2011/0107406 A1 | 5/2011 | Frost et al. | |
| 2011/0119748 A1 | 5/2011 | Edwards et al. | |
| 2011/0154318 A1 | 6/2011 | Oshins et al. | |
| 2011/0258701 A1* | 10/2011 | Cruz | G06F 21/564 718/1 |
| 2012/0254951 A1 | 10/2012 | Munetoh et al. | |
| 2013/0074181 A1* | 3/2013 | Singh | H04L 41/0668 726/22 |
| 2013/0347131 A1 | 12/2013 | Mooring et al. | |
| 2014/0317677 A1 | 10/2014 | Vaidya et al. | |
| 2019/0014154 A1 | 1/2019 | Vaidya et al. | |
| 2020/0092336 A1 | 3/2020 | Vaidya et al. | |

FOREIGN PATENT DOCUMENTS

| | | |
|---|---|---|
| CN | 102652305 A | 8/2012 |
| CN | 102880828 A | 1/2013 |
| EP | 2984600 B1 | 7/2019 |
| EP | 3567504 A1 | 11/2019 |
| GB | 2479619 A | 10/2011 |
| JP | 2001282737 A | 10/2001 |
| JP | 2007293848 A | 11/2007 |
| JP | 2010073011 A | 4/2010 |
| JP | 2011008780 A | 1/2011 |
| JP | 2012212391 A | 11/2012 |
| WO | 9809209 A1 | 3/1998 |
| WO | 2008119961 A1 | 10/2008 |
| WO | 2014172206 A1 | 10/2014 |

OTHER PUBLICATIONS

Author Unknown, "RSA Data Loss Prevention Suite," RSA Solution Brief, Month Unknown 2011, 4 pages, EMC Corporation.
Author Unknown, "Symantec Endpoint Protection 12.1.2," Data Sheet: Endpoint Security, Oct. 2012, 6 pages, Symantec Corporation.
Author Unknown, "Threat Assessment," Apr. 19, 2013, 4 pages, McAfee, Inc.
Author Unknown, "Virtual Security in the Data Center," A Custom Technology Adoption Profile Commissioned by Cisco Systems, Jan. 2012, 8 pages, Forrester Research, Inc., Cambridge, MA.
Author Unknown, "VMware vCloud Networking and Security Overview: Networks and Security for Virtualized Compute Environments," White Paper, Month Unknown 2012, 8 pages, VMware, Inc., Palo Alto, CA, USA, Retrieved from http://www.vmware.com/files/pdf/products/vcns/vCloud-Networking-and-Security-Overview-Whitepaper/pdf.
Garfinkel, Tal, et al., "A Virtual Machine Introspection Based Architecture for Intrusion Detection," In Proc. Network and Distributed Systems Security Symposium, Feb. 2003, pp. 1-16.
International Search Report and Written Opinion for Commonly owned International Patent Application PCT/US2014/033884, dated Aug. 14, 2014, 14 pages, International Searching Authority (EPO).
Marko, K., "2012 State of the Data Center," InformationWeek Reports, Jun. 2012, 33 pages, Retrieved from http://reports.informationweek.com/abstract/6/8845/data-center/research-2012-state-of-the-data-center.html.

* cited by examiner

FRAMEWORK FOR COORDINATION BETWEEN ENDPOINT SECURITY AND NETWORK SECURITY SERVICES

CLAIM OF BENEFIT TO PRIOR APPLICATIONS

This application is a continuation application of U.S. patent application Ser. No. 16/684,400, filed Nov. 14, 2019, now published as U.S. Patent Publication 2020/0092336. U.S. patent application Ser. No. 16/684,400 is a continuation application of U.S. patent application Ser. No. 16/112,732, filed Aug. 26, 2018, now issued as U.S. Pat. No. 10,511,636. U.S. patent application Ser. No. 16/112,732 is a continuation application of U.S. patent application Ser. No. 13/866,869, filed Apr. 19, 2013, now issued as U.S. Pat. No. 10,075,470. U.S. patent application Ser. No. 16/684,400, now published as U.S. Patent Publication 2020/0092336, U.S. patent application Ser. No. 16/112,732, now issued as U.S. Pat. No. 10,511,636, and U.S. patent application Ser. No. 13/866,869, now issued as U.S. Pat. No. 10,075,470, are incorporated herein by reference.

BACKGROUND

This document relates to virtual machines and security services.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine, can execute one or more virtual machines.

A virtual machine can be accessed locally or remotely, through a network connection. For example, it is possible to use a remote desktop client to access a virtual machine remotely. A remote desktop client is a computer program that communicates user interface information with a remote computer system. Generally, the user interface information includes display data, which is received from the remote computer system and displayed on the computer local to the user, and sends keyboard and mouse inputs generated by the user to the remote computer system. In this way, applications executing remotely from the user can be accessed and interacted with by the user.

Further, applications and operating systems, regardless of executing on a virtual machine or directly on a host machine, are still vulnerable to programs or codes, such as a virus or a worm, that surreptitiously enters a computer environment. Viruses often replicate themselves, or cause themselves to be replicated, thereby consuming excessive amounts of computer resources, and causing degradation or disruption of computer operation. A "worm" can be defined as a virus that automatically attaches itself to outgoing email or other network messages. Some viruses erase or corrupt disk files, or require that a hard disk be entirely reformatted. A virus may wreak its havoc immediately upon entering a computer environment, or may lie dormant until circumstances cause their code to be executed by the host computer. Regardless as to the potential damage that can be caused by a particular virus, all viruses are generally considered malicious, should be prevented from infecting a system, and should be removed if discovered. For present purposes, the term "virus" will refer to any such malicious code.

The threat of viruses is particularly acute in a networked environment, where a computer on the network is accessible to viruses of varying degrees of sophistication and severity created by legions of hackers. These viruses may surreptitiously enter the computer environment through a variety of mechanisms, for example, as attachments to emails or as downloaded files, or through a service program listening to a network port. Various examples of antivirus software include system scanners that scan a complete disk drive and memory system for malicious code, and "on-access" scanners that scan a file when it is requested by the operating system. Other types of antivirus software are possible.

SUMMARY

In general, one aspect of the subject matter described in this document can be embodied in a technique that includes operating one or more virtual machines each in accordance with a respective security container, wherein the respective security container is associated with a respective rule that specifies transfer of the virtual machine from the respective security container to a quarantine container based on one or more criteria; operating one or more endpoint security services on the one or more virtual machines to identify one or more security threats associated with one or more of the virtual machines; obtaining one or more tags generated by the one or more security services wherein each tag is for a virtual machine that is associated with one of the identified security threats; identifying one of the virtual machines that requires transfer to the quarantine container based on, at least, one or more of the obtained tags and one or more of the criteria; and transferring the identified virtual machine to the quarantine container. Other embodiments of this aspect include corresponding systems, apparatus, and computer software encoded on a non-transitory machine readable storage medium.

These and other aspects can optionally include one or more of the following features. Security services can include antivirus scanners, data loss prevention (DLP), file integrity monitoring, rootkit detector, vulnerability management, network firewalls, web security controls, and intrusion detection/prevention systems. A security threat can be resolved to remove a tag that caused the identified virtual machine to be transferred to the quarantine container from the respective security container of the identified virtual machine; and the identified virtual machine can be transferred from the quarantine container to the respective security container of the identified virtual machine. A user interface can be provided to create and configure the one or more respective security containers, wherein the user interface is configured to create one or more tag-based rules for each of the one or more respective security containers. Each tag can comprise a virtual machine identifier, a tag label, and a tag value. The respective rule can specify a threat level threshold, and wherein identifying the virtual machine comprises comparing a tag value with the threat level threshold. The one or more endpoint security services can include one or more of an antivirus scanner configured to generate tags in accordance with a known tag format, a vulnerability management mechanism configured to generate tags in accordance with the known tag format, or a data loss prevention mechanism configured to generate tags in accordance with the known tag format. Operating the one or more virtual machines can comprise: detecting a user membership group in response to a virtual machine login event; selecting a respective security container based on the user membership group; and assigning a virtual machine associated with the virtual machine login event to the selected security container. The one or more respective security containers can comprise: a first security container associated with a first rule that specifies transfer of a virtual machine from the first security container to a first quarantine container based on one or more first criteria; and a second security container associated with a second rule that specifies transfer of a virtual machine from the second security container to a second quarantine container based on one or more second criteria. Implementations can include operating a tag communication layer to receive the one or more tags from the one or more security services, the tag communication layer being agnostic to the one or more endpoint security services. Implementations can include operating a network firewall in accordance with the quarantine container to restrict network connectivity of the identified virtual machine.

Particular embodiments of the subject matter described in this document can be implemented so as to realize one or more of the following advantages. Providing a framework for security services to tag virtual machines can enable rapid and automatic transferring of a tagged virtual machine to a different, more stringent container such as a quarantine container. Once a virus has been detected on a virtual machine, it is advantageous to minimize the time that a virtual machine spends outside of a quarantine container as to prevent the spread or impact of the virus on unaffected systems, prevent the leakage of sensitive information, or both.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes a framework to achieve synergistic orchestration among different endpoint security (e.g., antivirus software) and network security services (e.g., network firewalls). Such a framework can enable rapid and automatic responses to breaches of a security policy within a virtual machine environment, while enabling the customer to select the best of breed in endpoint and network security services, including those services by different vendors.

Figure 1:
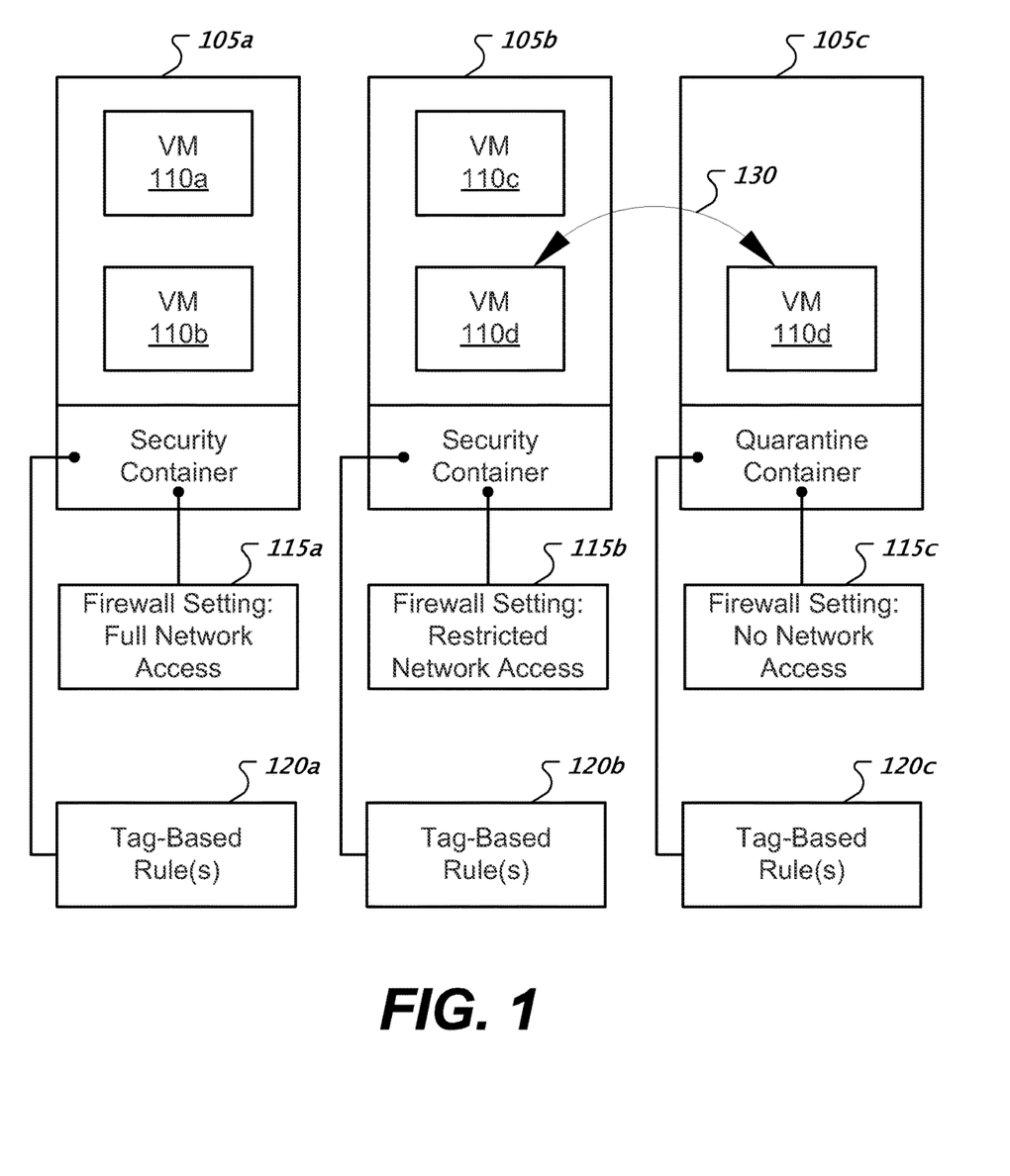
FIG. 1 shows an example of virtual machines being assigned to security containers and the transfer of a virtual machine between security containers.

FIG. 1 shows an example of virtual machines being assigned to security containers and the transfer of a virtual machine between security containers. A physical machine such as a data processing apparatus can execute virtual machines 110$a$-$d$ in accordance with respectively assigned security containers 105$a$-$c$. The security containers 105$a$-$c$ are operating environments for virtual machines that can specify policies such as firewall settings 115$a$-$c$, operational settings for one or more security services, and tag-based rules 120$a$-$c$. In some implementations, the security containers 105$a$-$c$ are associated with respective firewall settings 115$a$-$c$ that have different allowed levels of network connectivity. In this example, a first security container 105$a$ is associated with a firewall setting 115$a$ that specifies full network access, whereas a second security container 105$b$ is associated with a firewall setting 115$b$ that specifies restricted network access. A quarantine container 105$c$ can be associated with a firewall setting 115$c$ that specifies no network access, for example. A tag-based rule 120$a$-$b$ can specify a transfer 130 to the quarantine container 105$c$ based on one or more criteria such as criteria based on security tags provided by one or more security services. A security tag can represent a security determination generated by a security service's review of a virtual machine 110$a$-$d$. In some cases, a rule 120$c$ can specify a transfer 130 out of the quarantine container 105$c$ once a tag is cleared by a security service.

Figure 2:
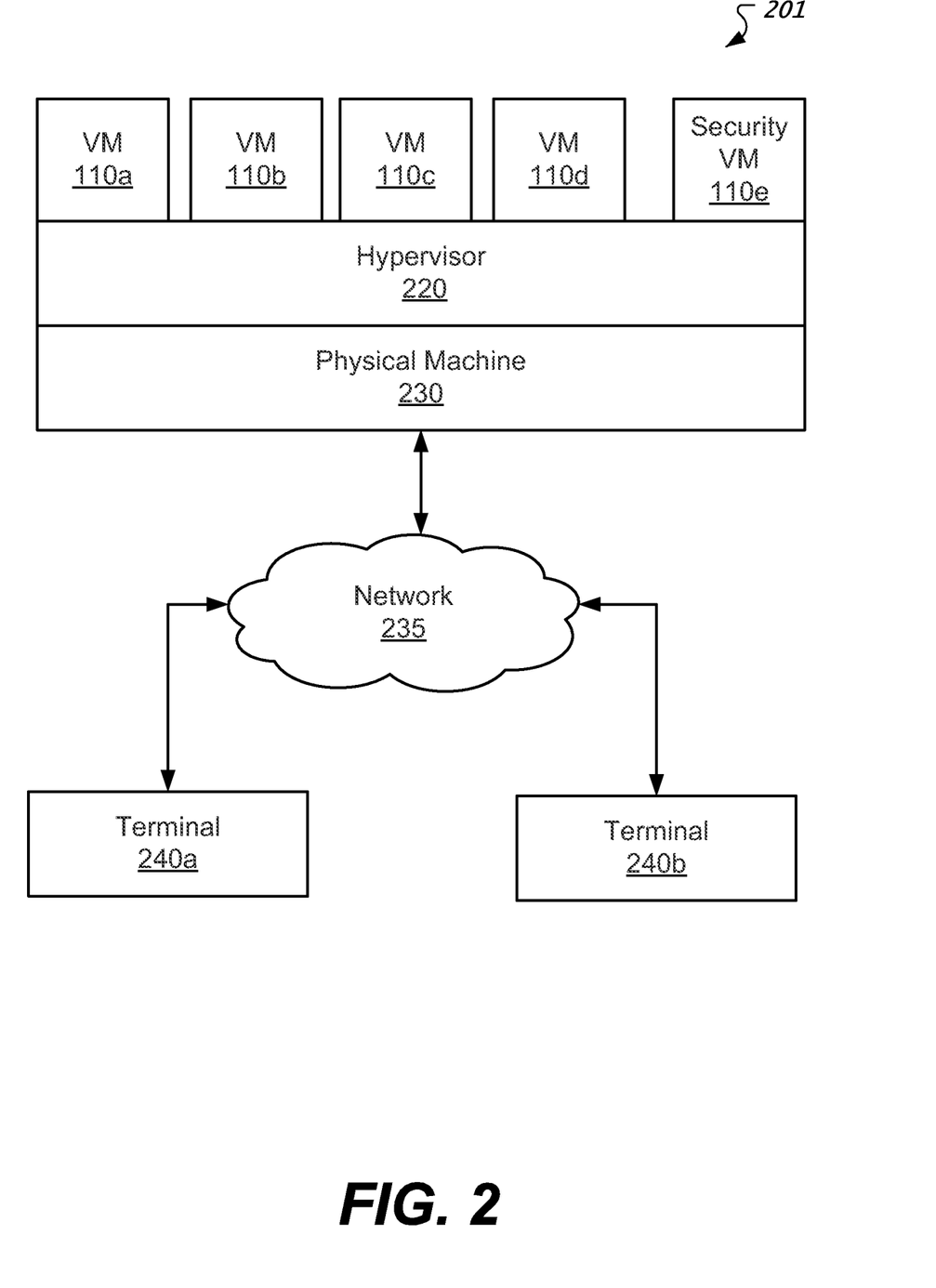
FIG. 2 shows an architecture for an example of a system that is configured to execute virtual machines.

FIG. 2 shows an architecture for an example of a system 201 that is configured to execute virtual machines. In the system 201, a physical machine 230 can be configured to execute virtual machines 110$a$-$e$ using a hypervisor 220. Computer terminals 240$a$-$b$ can access the virtual machines 110$a$-$e$ using a network 235. In some implementations, the system 201 can be configured to provide a virtual desktop infrastructure (VDI) via computer terminals 240$a$-$b$. A VDI allows computer administrators to host and administer user desktops on virtual infrastructure, e.g., VDI gives each user an independent virtual machine for desktop computing. In some implementations, the computer terminals 240$a$-$b$ are configured to provide a physical front-end to a virtual machine 110$a$-$e$ by using a remote desktop protocol. Various examples of computer terminals 240$a$-$b$ include client access devices such as PCs, thin clients, zero clients. Other types of terminals are possible.

Some virtual machines 110$a$-$d$ can each be assigned to one of the security containers 105$a$-$c$, while one or more other virtual machines 110$e$, referred to as security virtual machines, can be configured to provide endpoint security services, network security services, or both for the virtual machines 110$a$-$d$. For example, the security virtual machine 110$e$ can execute an endpoint security service such as an antivirus scanner that scans the other virtual machines 110$a$-$d$ for security threats such as viruses. In some implementations, an antivirus scanner can interact with thin agents running on the virtual machines 110$a$-$d$ to perform scans of the virtual machines' memory, persistent storage, and network communications, for example. In further implementations, an antivirus scanner on the security virtual machine 110$a$ can scan the other virtual machines 110$a$-$d$ autonomously. In other implementations, the hypervisor 220 can perform one or more network security services such as operating a network firewall.

Figure 3:
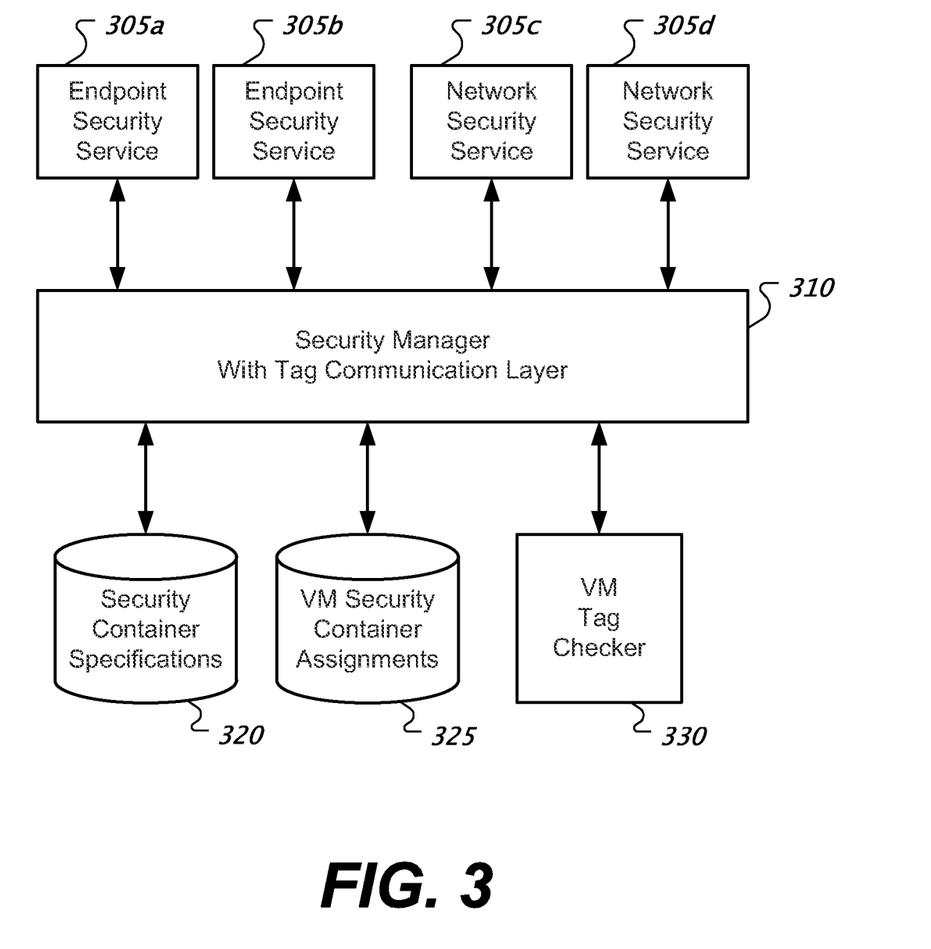
FIG. 3 shows an architecture for an example of a security framework that includes a security manager.

FIG. 3 shows an architecture for an example of a security framework that includes a security manager 310. A virtual infrastructure can deploy security services 305$a$-$d$ that include endpoint security services 305$a$-$b$ and network security services 305$c$-$d$. Various examples of endpoint security services 305$a$-$b$ include antivirus scanners, data, loss prevention (DLP), file integrity monitoring, rootkit detector, and vulnerability management. Other types of examples are possible. Various examples of network security services 305c-d include network firewalls, web security controls, and intrusion detection/prevention systems. Other types of examples are possible.

The security manager 310 can interact with the security services 305a-d based on security containers. The security manager 310 can provide a user interface for creating and configuring security containers. A security container can specify or more security services to be executed on a virtual machine assigned to the container. One or more rules can be associated with each security container. Such rules can be stored in a security container specifications database 320. In some implementations, a rule can specify an action (e.g., move to quarantine container) based on an outcome of a security scan. Further, configuration information for one or more of the services 305a-d can be stored in a security container specifications database 320. Configuration information can be specified for each security service and can include parameters such as a name of a security service, a location of an executable corresponding to the security service, or security settings. Other types of parameters are possible. For example, configuration information for an antivirus security service can include scan frequency and scan type. In some implementations, the security manager 310 can operate the security services 305a-d based on the configuration information specified by a security container. The security manager 310 can assign a virtual machine to a security container; such assignments be stored in a virtual machine security container assignment database 325.

One or more of the security services 305a-d can assign a tag to a virtual machine based on an outcome of a security scan, a security event, or both. The security manager 310 can provide a tag communication layer to receive tags from one or more of the security services 305a-d and distribute tags to components such as a virtual machine tag checker 330. In some implementations, tag information can include a virtual machine identifier, a tag name, and a tag value. Other types of tag information are possible. In some implementations, a tag can be communicated to the tag communication layer using an Extensible Markup Language (XML). The virtual machine tag checker 330 can access tags generated by the security services 305a-d and compare them with one or more criteria specified by a rule of a security container. Based on satisfying the one or more criteria, an action associated with the rule can be automatically executed.

Figure 4:
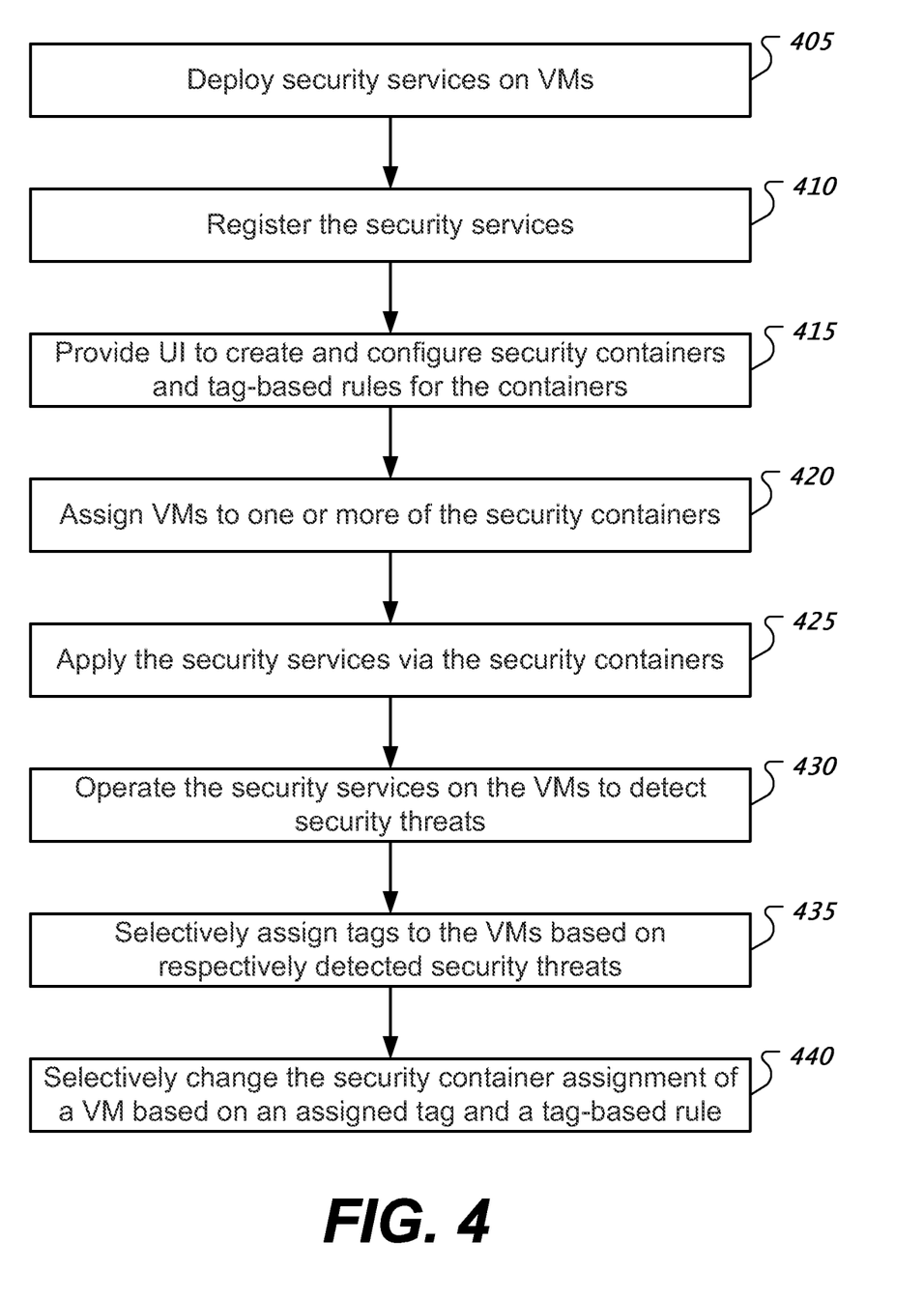
FIG. 4 shows a flowchart for an example of a security process.

FIG. 4 shows a flowchart for an example of a security process as implemented by one or more data processing apparatus. At 405, the process deploys security services on virtual machines (VMs). In some implementations, deploying security services can include installing security software such as an antivirus scanner. At 410, the process registers the security services. Registering a security service can include configuring a security manager to operate a security service. Registering a security service can include configuring a security manager to recognize tags generated by a security service.

At 415, the process provides a user interface (UI) to create and configure security containers and tag-based rules for the containers. Providing a UI can include displaying a graphical user interface (GUI). Providing a UI can include providing a command line interface (CLI). In some implementations, the UI can be designed to specify different service configuration options for different security containers. For example, one security container may have a hourly antivirus scan requirement, whereas another security container may have a daily or weekly antivirus scan requirement.

At 420, the process assigns VMs to one or more of the security containers. In some implementations, the UI can further provide an interface for assigning a virtual machine to a security container. In some implementations, assignment of a VM to a security container is performed dynamically in response to a login event. For example, assignment can be based on a user-identity or a user-group identity of a user associated with the login event.

At 425, the process applies the security services via the security containers. Applying the security services via the security containers can include accessing and using one or more service configuration options based on what is required by a security container. At 430, the process operates the security services on the VMs to detect security threats. In some implementations, the security manager can cause a security service to perform a scan of a virtual machine at periodic time intervals in accordance with a requirement of a security container. At 435, the process selectively assigns tags to the VMs based on respectively detected security threats. For example, a security service can output a tag based on a detection of a threat such as a virus or a misconfiguration that creates a vulnerability. Various examples of a tag include text-based labels such as "virus.threat=detected", "malware.threat=high", or "dlp.violation=HIPAA". Other types of labels are possible, for example a tag can be represented in a binary format rather than a text format. In some implementations, a tag can include an industry standard vulnerability score such as a Common Vulnerability Scoring System (CVSS) score, for example, "CVSS=9.7". At 440, the process selectively changes the security container assignment of a VM based on an assigned tag and a tag-based rule. For example, a security container may specify that any assigned VM having a CVSS score of 7 or greater be transferred to a quarantine container that blocks network access.

Figure 5:
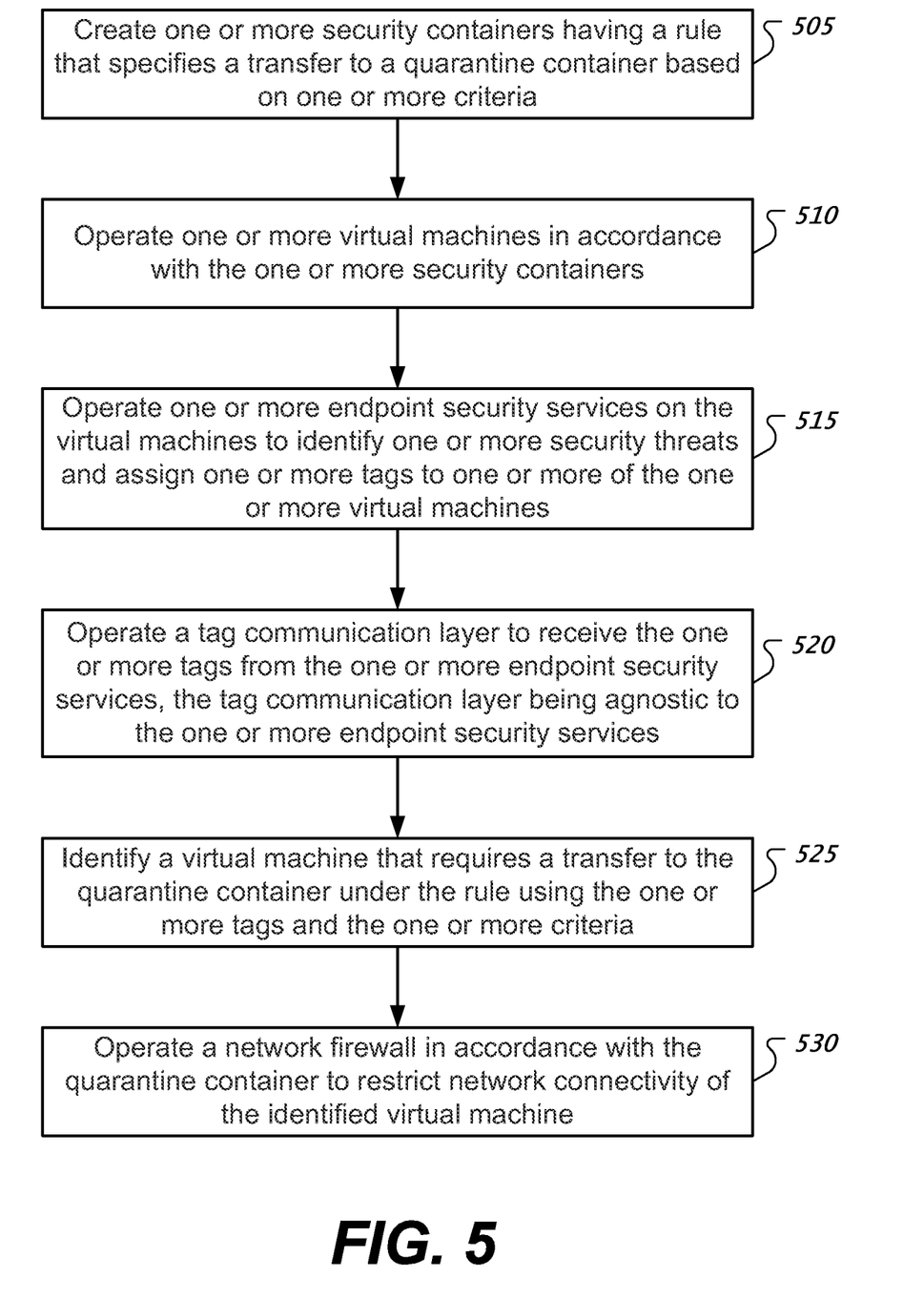
FIG. 5 shows a flowchart for another example of a security process.

FIG. 5 shows a flowchart for another example of a security process as can be implemented by one or more data processing apparatus. At 505, the process creates one or more security containers having a rule that specifies a transfer to a quarantine container based on one or more criteria. Various examples of criteria include a threat level threshold criterion, vulnerability criterion, file integrity criterion, rootkit detection criterion. Other types of criteria are possible. A rule, for example, can specify a threat level threshold criterion, that if met or exceeded, would trigger a transfer. Another rule, for example, can specify a rootkit detection criterion, that if met, e.g., a rootkit was detected, would trigger a transfer. Operating the one or more virtual machines can include detecting a user membership group in response to a virtual machine login event, selecting a security container based on the user membership group, and assigning a virtual machine associated with the virtual machine login event to the selected security container.

At 510, the process operates one or more virtual machines in accordance with the one or more security containers. At 515, the process operates one or more endpoint security services on the virtual machines to identify one or more security threats and assign one or more tags to one or more of the one or more virtual machines. Operating one or more endpoint security services can include causing a service to send a tag to a tag communication layer.

At 520, the process operates a tag communication layer to receive the one or more tags from the one or more endpoint security services, the tag communication layer being agnostic to or independent of the one or more endpoint security services. Such an agnostic tag communication layer can enable security services from the same or different vendors to access the tag communication layer and enable inter-service coordination via a security manager. Further, the tag communication layer can employ a known tag format such that the endpoint security services provide tags in accordance with the known tag format. In some implementations, operating the tag communication layer includes receiving a tag that includes a virtual machine identifier, a tag label, and a tag value. In some implementations, operating the tag communication layer includes receiving a data packet containing a tag from a security service. Operating the tag communication layer can include storing tags produced by an endpoint security service. In some implementations, the tag communication layer is based on a publish/subscribe model where a security service publishes tags to a middleware engine and a tag checker subscribes to the middleware engine to receive the tags.

At 525, the process identifies a virtual machine that requires a transfer to the quarantine container under the rule using the one or more tags and the one or more criteria. Identifying a virtual machine that requires a transfer can include retrieving a tag from a tag database. Identifying a virtual machine that requires a transfer can include retrieving tag data stored in one or more memory locations via a tag communication layer. Identifying a virtual machine that requires a transfer can include comparing accessed virtual machine tags with one or more rules of a corresponding security container. The process can include transferring the identified virtual machine to the quarantine container. Transferring the identified virtual machine can include updating a security container assignment data entry. Transferring the identified virtual machine can include adding a virtual machine identifier to a list of virtual machines assigned to a security container. At 530, the process operates a network firewall in accordance with the quarantine container to restrict network connectivity of the identified virtual machine.

Figure 6:
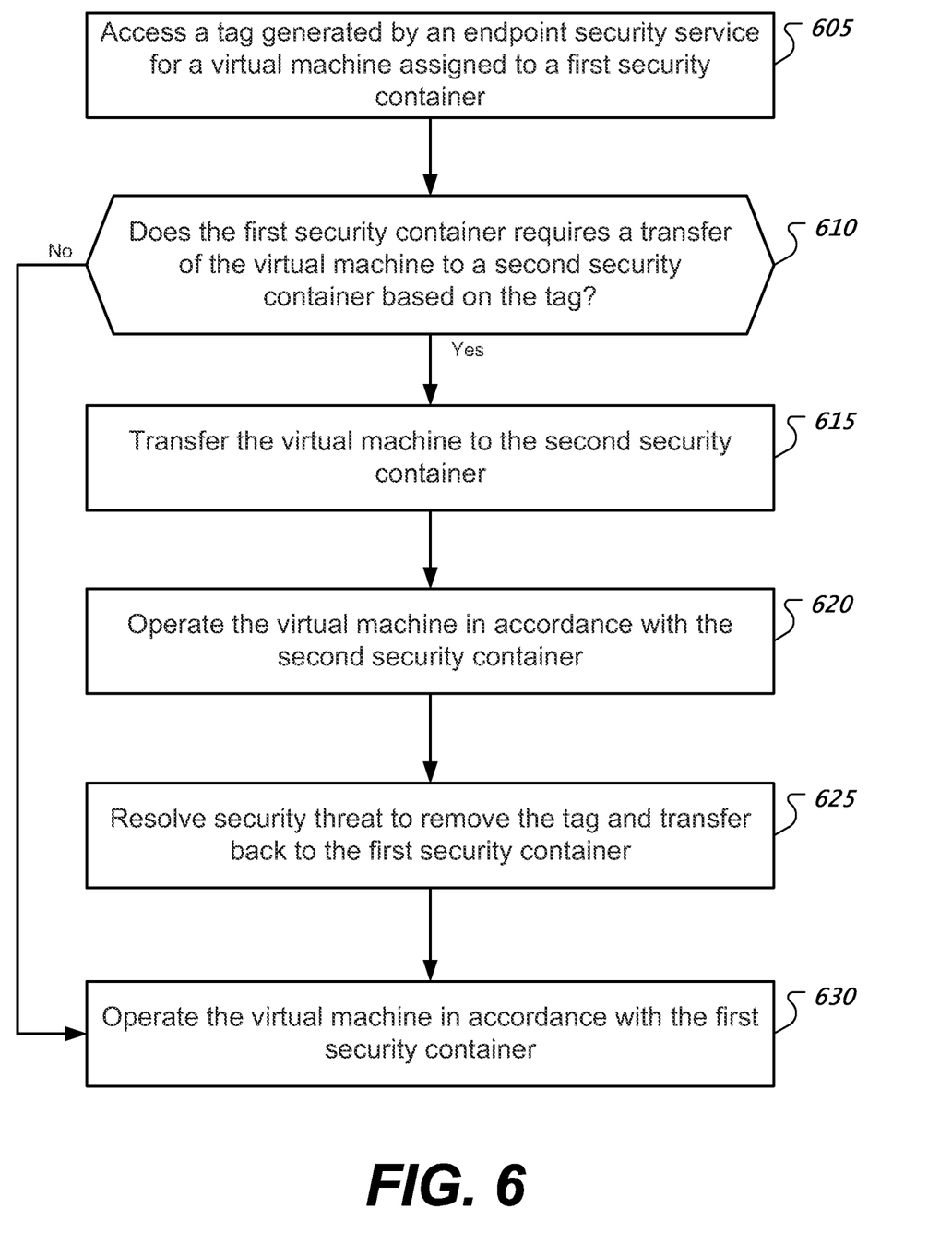
FIG. 6 shows a flowchart for another example of a security process.

FIG. 6 shows a flowchart for another example of a security process. At 605, the process accesses a tag generated by an endpoint security service for a virtual machine assigned to a first security container. At 610, the process determines whether the first security container requires a transfer of the virtual machine to a second security container based on the tag. If a transfer is not required, the process continues to operate the virtual machine in accordance with the first security container at 630. If a transfer is required, the process transfers the virtual machine to the second security container at 615. At 620, the process operates the virtual machine in accordance with the second security container. At 625, the process resolves security threat to remove the tag and transfer back to the first security container. Resolving the security threat can include removing virus-infected files, applying software updates, or terminating vulnerable processes/software. Resolving the security threat can include re-executing a security service and determining whether to remove the tag based on a determination of the security service. At 630, the process operates the virtual machine in accordance with the first security container.

One or more of the security processes described herein can be employed in the following example. In a typical hospital datacenter, an administrator can deploy endpoint security solutions such as an anti-virus product, a DLP product, a vulnerability management product, and network security services such as a firewall product, a web security control product through the security manager. The administrator can use a security manager's GUI to create user membership groups for different hospital employees such as a doctor user group and a nurse user group. Further, the administrator can use the GUI to create security containers for each of the user membership groups. In addition, the administrator can also create a group, and security container, for patient medical record servers. The administrator can use the GUI to create rules for the security containers based on security policies. For example, the hospital's board might mandate the following security policies:

Security Policy 1. Doctors are allowed outside access to the Internet but they need to be subject to web security controls (e.g., not allowed to browse to websites classified by the board as "Restricted");

Security Policy 2. Nurses are not allowed external interact access;

Security Policy 3. Doctors and Nurses machines need to be scanned with an antivirus service on a daily basis;

Security Policy 4. Any machine diagnosed with a virus or known ma ware risk level higher than "Medium" must be quarantined with no network access;

Security Policy 5. Doctors and Nurses machines need to be scanned with a DLP service on a weekly basis for HIPAA policy violations (e.g., these machines must not permanently store confidential patient data);

Security Policy 6. If confidential patient data exists on a machine, the machine needs to be quarantined with no network access to the outside world and the data needs to be removed;

Security Policy 7. Medical staff can access patient medical record servers to access patient data but non-medical staff cannot;

Security Policy 8. All machines will be scanned for vulnerabilities on a weekly basis through a vulnerability management service; and Security Policy 9. Machines with vulnerabilities with CVSS scores higher than 8 must be quarantined.

In order to comply with the aforementioned mandated security policies, the administrator may use the security manager's GUI to perform the following:

a) Assign a web security control security service to the "Doctors" security container (addresses Security Policy 1), b) Assign a network firewall service with a policy to block access to external websites to the "Nurses" security container (addresses Security Policy 2), c) Assign endpoint security antivirus service to the "Doctors" security container and the "Nurses" security container with a daily scan frequency (addresses Security Policy 3), d) Assign endpoint security DLP service to the "Doctors" security container and the "Nurses" security container such that the DLP service scans for violations on a weekly basis (addresses Security Policy 5), e) Assign a network firewall service with a policy to allow access to the patient medical record servers to the "Doctors" security container and the "Nurses" security container (addresses Security Policy 7), f) Assign a network firewall service with a policy to block access to patient medical record servers to security containers associated with non-medical staff (addresses Security Policy 7), g) Assign endpoint security vulnerability management service to all containers and set the scan frequency to be weekly (addresses Security Policy 8), h) Assign tag-based rules to the security containers such that a virtual machine tagged with a "medium" or higher threat level is to be transferred to a quarantine container (addresses Security Policy 4), i) Assign tag-based rules to the security containers such that a virtual machine tagged with a DLP violation is to be transferred to a quarantine container (addresses Security Policy 6), and j) Assign tag-based rules to the security containers such that a virtual machine tagged with a CVSS score higher than 8 is to be transferred to a quarantine container (addresses Security Policy 9).

Based on input received via the GUI, the security manager can output one or more configuration files that capture the assigned services and tag-based rules. In some implementations, the configuration files can be formatted based on a text-based format such as XML or a binary format. In addition, the security manager can maintain one or more log files that identifies virtual machines and associated events, such as tag assignment or rule-based actions such as a transfer to a quarantine container.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory machine readable medium storing a program for applying security policies to virtual machines (VMs), the program for execution by at least one processing unit, the program comprising sets of instructions for:
   receiving through a user interface data to create a first security container to associate with the VMs;
   defining the first security container and specifying a first set of network connectivity settings for the VMs associated with the first security container;
   associating the first security container with a security service that is to be performed on any VM associated with the first security container to detect a security condition on the VM; and
   defining a second security container to associate with any VM with the detected security condition, and specifying a reduced, second set of network connectivity settings for any VM associated with the second security container.

2. The non-transitory machine readable medium of claim 1, wherein the program further comprises sets of instructions for:
   assigning a first VM to the first security container; and
   based on the assignment, performing the security service on the first VM to determine whether the security condition exists on the first VM.

3. The non-transitory machine readable medium of claim 1, wherein the set of instructions for associating a VM with the second security container comprises a set of instructions for removing the VM's association with the first security container.

4. The non-transitory machine readable medium of claim 1, wherein a first VM is assigned to the first security container upon a login event on the first VM.

5. The non-transitory machine readable medium of claim 4, wherein the login event is associated with a user membership group.

6. The non-transitory machine readable medium of claim 1, wherein the program further comprises a set of instructions for specifying a rule that requires a VM to be removed from the second security container and added to the first security container once a security condition on the VM has been resolved.

7. The non-transitory machine readable medium of claim 1, wherein the security service scans a first security container VM for viruses.

8. The non-transitory machine readable medium of claim 1, wherein the second set of network connectivity settings comprise a network firewall setting that restricts network connectivity of any VM associated with the second security container.

9. The non-transitory machine readable medium of claim 1, wherein the program further comprises sets of instructions for:
   providing a security manager to specify security containers, to associate VMs with tags, and to specify tag-based rules for moving VMs between security containers based on the VMs association with tags; and
   providing network security enforcers to enforce network security settings to VMs based on the VMs associated security containers.

10. The non-transitory machine readable medium of claim 1, wherein the second security container is a quarantine group container, a VM is added to the quarantine group container when the VM is detected to have a virus, and a VM is removed from the quarantine group container once the virus has been removed from the VM.

11. A method for defining network connectivity settings for virtual machines (VMs) executing on host computers in a datacenter, the method comprising:

receiving through a user interface data to create first and second containers to associate with the VMs;

specifying a first set of network connectivity settings for the VMs associated with the first container;

specifying a different, second set of network connectivity settings for the VMs associated with the second container; and associating VMs with the first and second containers in order to associate different network connectivity settings with VMs associated with different containers.

12. The method of claim 11, wherein the first and second containers are respectively first and second security containers with different network connectivity settings.

13. The method of claim 12, wherein VMs associated with the first security container have full network access while VMs associated with second security container have partial network access.

14. The method of claim 11, wherein the first and second containers are respectively a security container and a quarantine container.

15. The method of claim 14, wherein VMs associated with the security container have network access while VMs associated with quarantine container do not have network access.

16. The method of claim 14 further comprising associating a security service with at least one of the containers.

17. The method of claim 16, wherein the security service is a virus scan that is associated with the quarantine container, said virus scan performed on each VM associated with the quarantine container.

18. The method of claim 17, wherein a VM is removed from the quarantine container and associated with the security container once a virus has been removed from the VM.

19. The method of claim 11 further comprising defining different conditions for associating a VM with either the first container or the second container.

20. The method of claim 19, wherein at least one condition is a login event when a user of a particular membership group logs into a VM.

* * * * *